(12) United States Patent
de Seabra et al.

(10) Patent No.: US 10,013,422 B2
(45) Date of Patent: Jul. 3, 2018

(54) INCREMENTAL DATA PROCESSING

(71) Applicant: Yahoo Holdings, Inc., Sunnyvale, CA (US)

(72) Inventors: Bernardo de Seabra, San Francisco, CA (US); Rahul Ravindran, San Francisco, CA (US)

(73) Assignee: Oath Inc., New York, NY (US)

( * ) Notice: Subject to any disclaimer, the term of this patent is extended or adjusted under 35 U.S.C. 154(b) by 465 days.

(21) Appl. No.: 14/720,448

(22) Filed: May 22, 2015

(65) Prior Publication Data

US 2015/0347439 A1   Dec. 3, 2015

Related U.S. Application Data

(60) Provisional application No. 62/004,116, filed on May 28, 2014.

(51) Int. Cl.
*G06F 17/30* (2006.01)

(52) U.S. Cl.
CPC .. *G06F 17/30117* (2013.01); *G06F 17/30156* (2013.01)

(58) Field of Classification Search
None
See application file for complete search history.

(56) References Cited

U.S. PATENT DOCUMENTS

| | | | |
|---|---|---|---|
| 8,775,556 B1 * | 7/2014 | Matthews | G06F 17/3089 709/217 |
| 2008/0004958 A1 * | 1/2008 | Ralph | G06Q 30/02 705/14.45 |
| 2010/0274768 A1 * | 10/2010 | Wang | G06F 17/30575 707/676 |
| 2014/0282634 A1 | 9/2014 | Phan et al. | |

\* cited by examiner

*Primary Examiner* — Anh Tai Tran
(74) *Attorney, Agent, or Firm* — Cooper Legal Group, LLC

(57) ABSTRACT

Event logs in a video advertisement insertion network are processed to remove duplicate entries. One or more ad servers are continuously generating new event entries and writing them to a database. The entries are randomized such that generated time contiguous entries are distributed over multiple storage locations, thereby facilitating resource scaling and a uniform use of storage and computing resources. The distributed entries are read from the storage locations using sequential reads of chunks of the entries and processed to remove duplicate entries.

18 Claims, 9 Drawing Sheets

INCREMENTAL DATA PROCESSING

CROSS REFERENCE TO RELATED APPLICATIONS

This Patent document claims the benefit of priority of U.S. Provisional Patent Application No. 62/004,116, filed on May 28, 2014. The entire content of the before-mentioned patent application is incorporated by reference herein.

TECHNICAL FIELD

The present document relates to Internet based digital video advertising.

BACKGROUND

Online advertisers pay for the opportunity to display their ads to online users. Many online information providers, such as web site operators, generate revenue by placing advertisements on their web pages accessed by online users. Online advertisements can be in various forms, including banners of text or graphics placed within the web page being displayed to a user. In recent years, multimedia ads, including digital video segments, have been gaining popularity in online advertising. Video is often a compelling medium to communicate a commercial message more forcefully. Online video advertising tends to be resource intensive and, as such, advertisers have to pay more money for placing video advertisements.

SUMMARY

Event logs in a video advertisement insertion network are processed to remove duplicate entries. One or more ad servers are continuously generating new event entries and writing them to a database. The entries are randomized such that generated time contiguous entries are distributed over multiple storage locations, thereby facilitating resource scaling and a uniform use of storage and computing resources. The distributed entries are read from the storage locations using sequential reads of chunks of the entries and processed to remove duplicate entries.

In one example aspect, a computer-implemented method for de-duplicating event logs in an event transaction processing system is disclosed. The method includes receiving multiple event records, each event record including at least an event generation time stamp, an event identification, and an event description field, wherein each event identification uniquely identifies the corresponding event record, generating, for each event record, a salt value as a function of the corresponding event identification for that event record, distributing, canonically based on the salt values, the multiple event records over a number of storage locations, reading a chunk of event records from storage location, and removing duplicate entries from the chunk based on event identifications to generate de-duplicated event records. Each chunk of event records includes entries whose event generation time stamps are continuous and salt values are identical with respect to each other.

In another example aspect, an apparatus for de-duplicating event logs in an event transaction processing system is disclosed. The apparatus includes a module that receives multiple event records, each event record including at least an event generation time stamp, an event identification, and an event description field, wherein each event identification uniquely identifies the corresponding event record, a module that generates, for each event record, a salt value as a function of the corresponding event identification for that event record, a module that distributes, canonically based on the salt values, the multiple event records over a number of storage locations, a module that reads a chunk of event records from storage location, and a module that removes duplicate entries from the chunk based on event identifications to generate de-duplicated event records. Each chunk of event records includes entries whose event generation time stamps are continuous with respect to each other and salt values are identical to each other.

In yet another example aspect, a method for generating unique events in a video advertisement delivery network is disclosed. The method includes receiving a first notification of a first number of events logged at an ad server, receiving a second notification of a second number of events generated for billing by a billing system, comparing whether the first number and the second number are identical, and replaying, when the first number and the second number are not identical, a portion of the events logged at the ad server until the first number and the second number are identical.

In yet another example aspect, a communication system that includes one or more ad servers that generate events records pertaining to video advertisements served in a communication network and communicate the event records over a transport network, and a de-duplication mechanism that receives the event records from the transport network and removes duplicate entries from the event records by comparing with previously received event records within a time window is disclosed. The de-duplication mechanism includes a randomizer module that randomizes the event records, a distribution module that distributes the randomized event records to multiple computer platforms, a chunking module that reads a subset of records on a computer platform and a comparator module that identifies duplicate entries by comparing a unique identifier of each entry with any previously seen unique identifiers.

These, and other, aspects are disclosed in greater detail in detailed description below, with reference to the drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
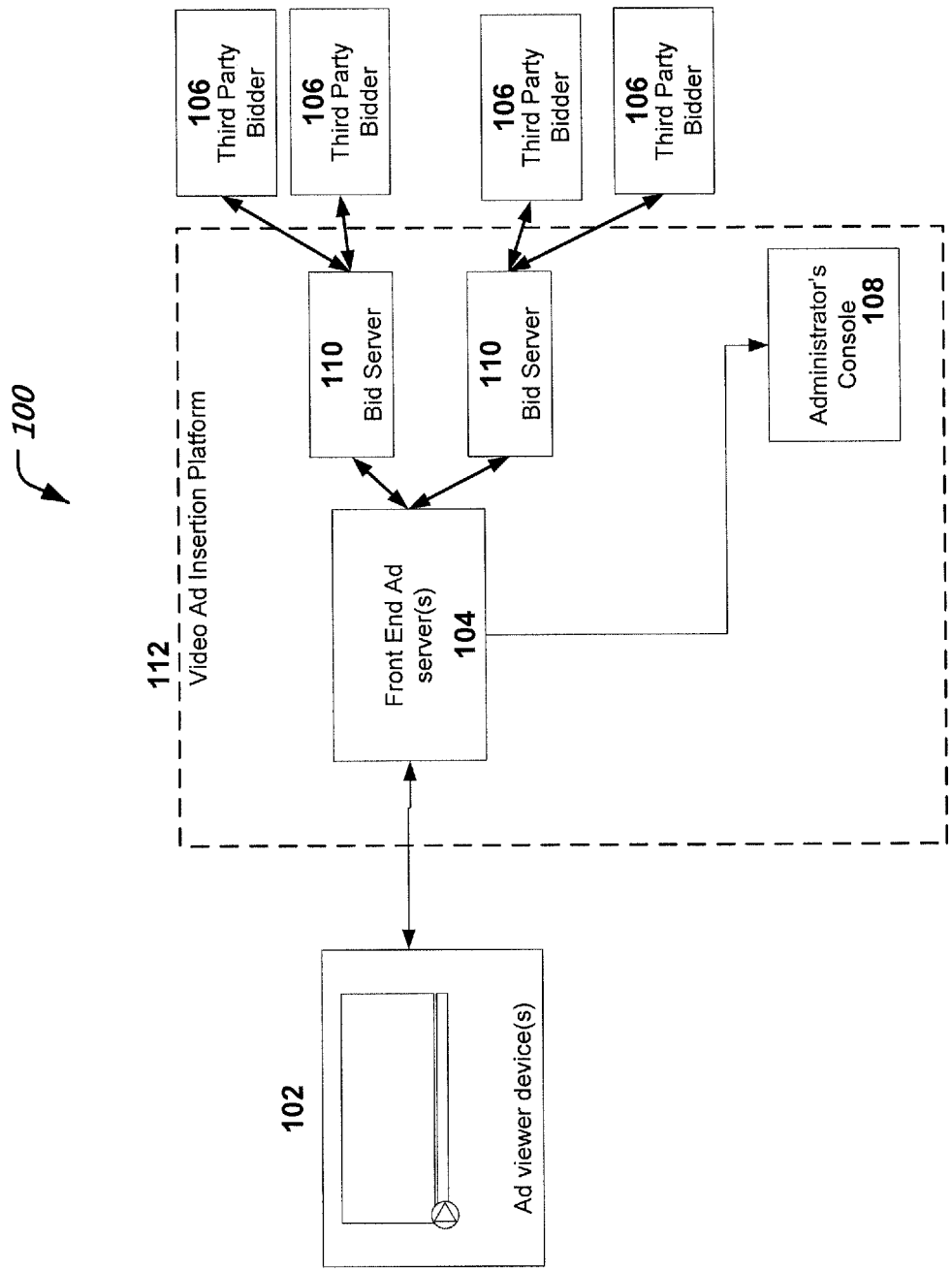
FIG. 1 depicts an example of an online video advertisement system.

In the following detailed description, numerous specific details are set forth to provide a full understanding of the present disclosure. The specific examples or embodiments of the present disclosure may be practiced without some of these specific details. In other instances, certain well-known structures and techniques have not been shown or described in detail but are nonetheless part of the present disclosure.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In networks that provide video advertisements to user devices that are being used to access content on the internet, accurate accounting of the number of advertisements successfully placed is useful in generating accurate billing data.

At any given time, a video advertisement platform may be serving millions and millions of users, and may be collecting ad data back from these user devices. Over a period of a few minutes, hundreds of millions of such entries may be accumulated. For various operational reasons, including, e.g., billing accuracy and system diagnostics, accounting of the received ad insertion notifications may be performed on an ongoing basis.

Techniques disclosed in this document, in one aspect, can be used for assessing whether an online video advertisement delivered to a user device is being displayed to a human user or a machine. In one aspect, these techniques can be implemented to work passively to make the assessment without providing any explicit instructions to a user to interact with the ad display. A determination is made about a user's viewing habits and daily schedule based on a user's short term and/or long term interactions with online video advertisement. The user's daily schedule is compared with known or determined templates of daily schedules of other human users. For example, in one embodiment, it is checked whether the user exhibits usual human usage such as a long period of inactivity (sleep time) or high level of usage at certain times of user's day (e.g., late evening), etc.

In some embodiments, based on the determination of the user's daily schedule, advertisements, that are suitable for the user's subjective time of day, are targeted to the user. The user's timing data on a user's viewing of day is "subjective" in the sense that the user may be in a different time zone than the time zone in which the decision about targeting ad is made. Therefore, the time zone as perceived by the user (e.g., the time zone of the user) may be used for the targeting. In some embodiments, information of users that are determined not to be human users but computers is stored and is used to exclude such machines from future ad deliveries.

A "user" in this context may not necessarily represent a single human being. In some embodiments, a user may be identified by a unique cookie stored on a computer used by one or more human users. The cookie may be tied to one login user id. For example, for the perspective of a digital video advertisement system, a shared workstation may have multiple users with each user having user-specific login credentials. In some embodiments, a user may not be tied to a specific computer. For example, human users may often be online using one of many connected devices they possess (e.g., a computer, a smartphone, a tablet, etc.). In such a case, the digital advertisement insertion system may track the human user as a single user, regardless of the device being used for the user's online activity.

Examples of Online Video Advertisement Systems

FIG. 1 depicts a simplified view of an example of online video advertisement insertion architecture 100. An ad viewer's device 102 (e.g., a wireless or a mobile device, as discussed above) may be communicatively coupled (e.g., via the internet and a wired or wireless connection) with an ad server 104. The ad server 104 may communicate bids to show video ads to the device 102 to multiple bidders 106 via a plurality of bid server platforms 110. An operator or administrator console 108 may be provided to control the operation of the ad server 104 and bid servers 110. The ad server 104 may also be called front end ad server 104 in the sense that this ad server provides an entry into an online video advertisement system for an ad placement request from a viewer's device. The bid servers 110 provide a bidding interface between third party bidding servers and the online video advertisement service.

The ad viewer's devices 102 may include a computing device capable of sending or receiving signals, such as via a wired or a wireless network. The ad viewer's devices 102 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

The ad viewer's devices 102 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The ad viewer's devices 102 may include or may execute a variety of operating systems, including a personal computer operating system, such as a Windows, iOS or Linux, or a mobile operating system, such as iOS, Android, or Windows Mobile, or the like. The ad viewer's devices 102 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The ad viewer's devices 102 may also include or execute an application to communicate content, such as, for example, textual content, multimedia content, or the like. The ad viewer's devices 102 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers such as the ad server 104 or bid server 110 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The ad server 104 may comprise a server that stores online advertisements for presentation to users. The ad server 104 may place online advertisements on websites, in applications, or other places where users are more likely to see them, such as during an online session or during computing platform use, for example.

The ad server 104 may perform functions such as handling incoming ad requests from multiple ad viewer devices 102, and may respond with an ad or a "no ad" placement. The ad server 104 may operate on a time budget, e.g., 50 to 100 msec. within which it responds to an ad request. The ad server 104 may provide ad data to the viewer device 102 using Video Ad Serving Template (VAST) format. The decision about which advertisement to be sent may be based on various factors and real time data such as publisher placement, uniform resource locator (URL), a geographic location of the viewer device, time of day, demographic segment to which the viewer belongs, and so on.

When the ad server 104 receives a video placement request from the viewer's device 102, the ad server 104 may pass on the request to two or more bid servers 110. The request may include information about the viewer, the viewer's demographic profile and other rules associated with the ad placement opportunity that may influence the selection of a winning bid. In some embodiments, the front end ad servers 104, bid servers 110 and the administrator's console 108 may form a part of a video ad insertion platform 112 offered by a single vendor, e.g., the BRX platform offered by Brightroll, Inc.

The bid servers 110 in turn request bids from multiple third party bidders 106. When bids are received from third party bidders 106, or at the end of a time period (e.g., 90 milliseconds), a decision is made about the winning bid. In some embodiments, the winning bid not only will have the highest dollar value but also should match the demographic profile of the viewer. For example, if the viewer is on the West coast of the United States, an advertisement for users on East coast may not be allowed to win bid even when the third party bidder bids the highest dollar value.

The winning bidder is then notified of winning the bid. The winning bidder is provided with information to allow the winning bidder to transmit a video advertisement to the viewer. After ads are placed to users, the number of ad placements and the details of ad placements may have to be calculated and presented to various entities for billing purpose. In general, event records, such as ad placements, generated in real time may have to be reconciled and counted accurately for billing and revenue purpose. Events may be joined. A configuration file defines events to be joined along with field to be used. The configuration file may be used in conducting financial computations based on events defined therein. Various methods of financial computations may be used. On-boarding new computations are changes to configuration file. Each financial computations may be an entry in a different HBase database described below.

Figure 2:
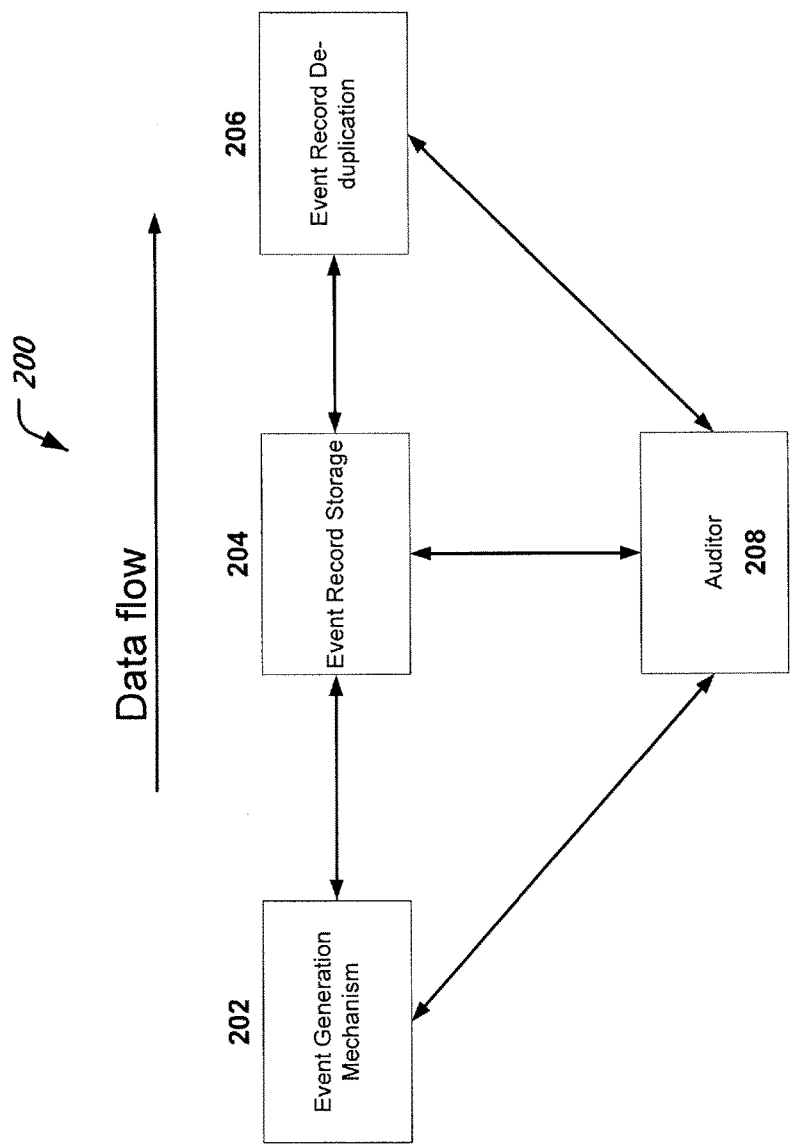
FIG. 2 depicts an example of an online video advertisement system including a mechanism for qualitative user assessment.

FIG. 2 depicts an example of system architecture 200 where events are generated by an event generation mechanism 202, stored in an event record storage, de-duplicated by a de-duplication mechanism 206 and audited for billing accuracy by an auditor 208. Examples of events include events related to serving of video advertisements to online viewers, the event of a user device on which an ad is being displayed reaching a midway point of displaying the video ad, financial transactions, users filling their shopping carts, stock buys or sells, and so on.

Figure 3A:
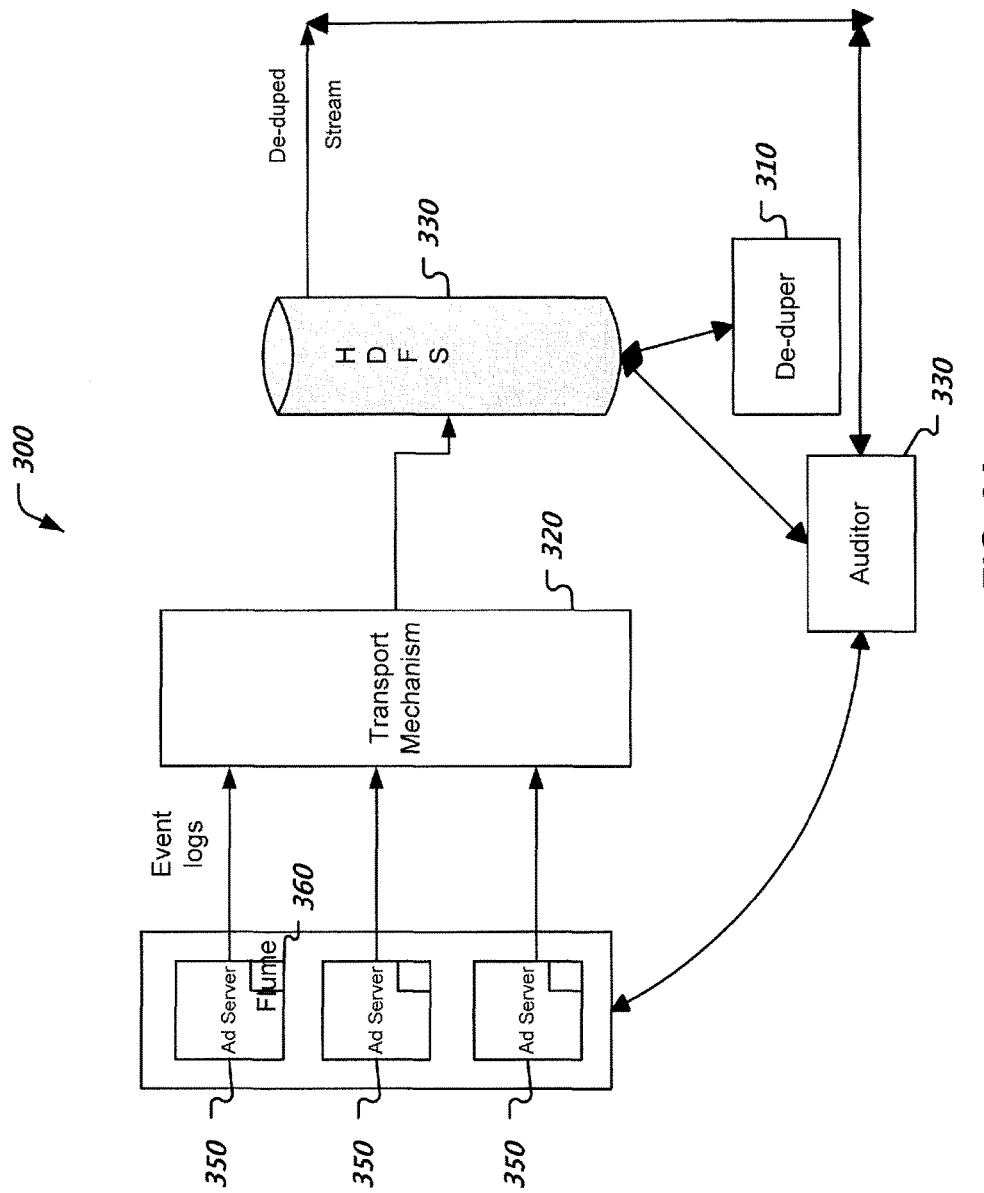
FIG. 3A depicts an example architecture of a communication system in which ad servers report events for billing.

FIG. 3A depicts an example architecture or system 300 of a video advertisement insertion system. In system 300, e.g., video advertisements may be displayed to users using a bidding-based advertisement insertion platform. Ad servers may serve the advertisements to user devices and generate data that reports ads served to user devices to a billing system. Ad servers may generate event logs that have entries, or event records, containing details of ads served. The log data from the ad servers may be streamed or continuously transmitted. For example, open source software such as Flume may be used for the reporting of records. This data is provided to a separate computing platform in a database such as the Hadoop distributed file system (HDFS) 330. The log data may be written as files that are identified by their respective filenames. A database such as the HBase database may be used for storing and accessing the data. The auditor 330 may verify if all log data were processed into the HBase database. If the auditor 330 finds missing log lines, log data is replayed. On replay, the HBase database may have duplicates which need to be de-duped. This would ensure that all the duplicates are removed and all the data are processed through the processing pipeline. While the HDFS 330 may store data as a number of files, HBase may store data in a more structured format such as a table. HBase table may be used as a stream. A time-based marker per table represents a point in time up to which data has been processed.

The system 300 may be operated in a continuous mode of operation—in which a quantum of time may be used (e.g., 2 minute) to process next data generated by the event logs. Thus, the system may be generating event records on a continuous basis, while also processing the event records (previously generated—e.g., 2 minutes ago) for billing purpose, as described in this document. In one advantageous aspect, the processing engine is never idle or waiting for next data to be accumulated and available, thereby operating as a continuous data processing system.

To take into account the possibility that some events may be delivered multiple times by the transport mechanism 320, a de-duping mechanism 310 may be used at the billing platform side to ensure that billing information is generated only once for each event.

The transport mechanism 320 used to assure that events generated will be delivered from the generation point to the billing platform including the HDFS 330 at least once may be the internet (e.g., TCP protocol). A safety redundancy may be built into the transport mechanism 320 such that some events may be delivered more than once. This is to assure that each event is conveyed to the billing system and no events are left out of the billing and auditing portion. In many deployments, each event may have to be counted exactly once—counting fewer or more events may have negative revenue implications.

To assist with de-duping, each event may be identified by its own unique identification (ID). The unique ID may be, for example, a 128 bit global unique identifier (UUID) that is generated randomly for each event, which generally assures uniqueness over millions and millions of transactions. The events may be received multiple times because of re-tries (e.g., TCP retries) or playbacks due to an auditor forcing a playback. For example, in one particular job, if 10,000 events were expected to be received, but actually 9,999 events were received in a given logical group (e.g., last one minute), the auditor may cause all 10,000 events to be played back to ensure that each and every event is communicated to the billing system.

While de-duping of events in theory appears to be a straightforward process because each event has a unique ID, in reality, due to the real-time nature of data generation and processing, brute-force de-duping by look-ups based on unique event IDs may not be a practical solution.

For example, a database that stores the events and their unique IDs could be considered to be a key-value store. Several off-the-shelf databases, such as the HBase database by Apache Foundation, are available as key-value stores where data is stored with a key (used for accessing) and a corresponding value (an entry).

If the possible time window over which event data may be duplicated is large (e.g., several hours or up to 7 days), then the number of events for which a de-duping comparison of the unique ID is to be done grows linearly with the duration of the window. The task of a straightforward de-duping may quickly become computationally impractical.

At the same time, there may be an operational desire to complete the entire de-duping operation in a short time (e.g., half an hour) so that billing data is generated reasonably soon after actual placement of the advertisements. Furthermore, a tight feedback window ensures that neither too many or too few advertisements get delivered. Over-delivery of ads may mean the ad platform loses money due to prior contractual arrangements.

Ad servers 350 may store all events on a storage disk in a suitable memory or storage system, in addition to transmitting them over the transport platform. An ad server such as the ad servers 350 may also generate files corresponding to its events where filenames have an embedded time stamp that indicates the effective period for which the file holds event logs.

Apache Flume or Flume is a log aggregator software provided by the Apache Software Foundation that delivers the events. Some implementations of ad servers may depend on Flume 360 running and being able to communicate. Flume 360 may roll files every two minutes. The files may be lexicographically ordered. Files written by Flume may be treated as a stream. A marker may point to a current location of the stream of files. For example, after processing a file currently pointed by the marker, the marker moves to the next file of the stream. This enables the system 300 to always process new data. At the same time, each ad server may notify the auditor 330 of the number of events in each time interval for which it has generated a log. The auditor 330 is also looking at the de-duped stream to count the number of events in each given interval to make sure that the number of de-duped outputs is equal to the total number of events that are reported by the ad servers. There may be potentially some replay if there is no number-match.

Figure 3B:
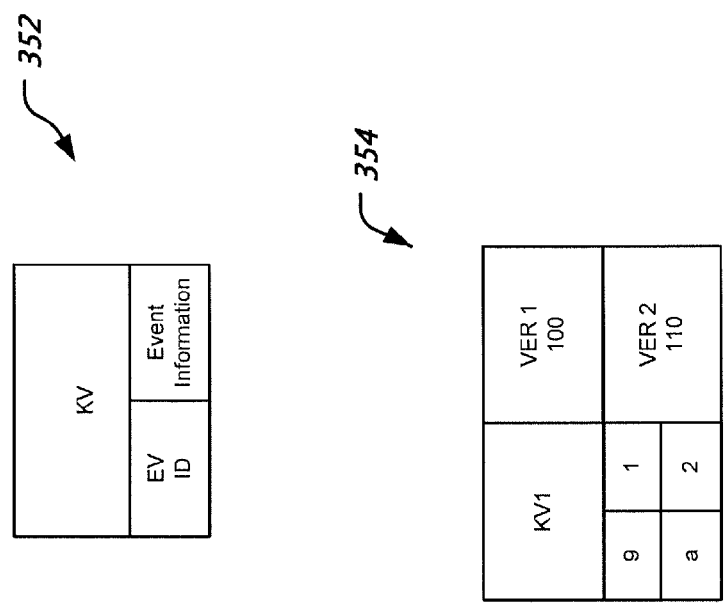
FIG. 3B depicts examples of event records generated by ad servers.

Database systems such as Apache HBase or HBase may be considered to be a key-value store that is built on top of HDFS 330. HBase is provided by the Apache Software Foundation. It provides a consistent read-out of data. That is, the same data that is written is also read back. With reference to FIG. 3B, an example entry 352 in HBase may include a key value (KV) that includes an Event ID (EV ID) and additional information for the corresponding event.

When data updated in HBase does not delete the previous data, it adds another entry to the value of the data. For example, KeyA may be storing value1 at a time T1. At a later time T2, KeyA may be storing value2. The database now has two entries for KeyA—one indicating value Value1 corresponding to T1 and the other indicating Value2, corresponding to T2. An external process may be able to retrieve value(s) for a particular key in a variety of different ways. For example, a simple value query may return the most recent entry for the key. Another way to retrieve values may be to specify a start time, and end time, a "time before" or a "time after" type database query. In FIG. 3B, entry 354 shows an example of two values stored in entry having key value KV1, with two different time stamps, and has two different versions of data stored.

Further, for practical considerations such as machines going down and becoming inaccessible, given database files may be stored redundantly across a number of different platforms. For example, a three-way redundancy may be used in which given data may be stored on three different machines. The data may be stored based using files that have been sorted in some fashion to distribute them across different platforms.

Figure 4:
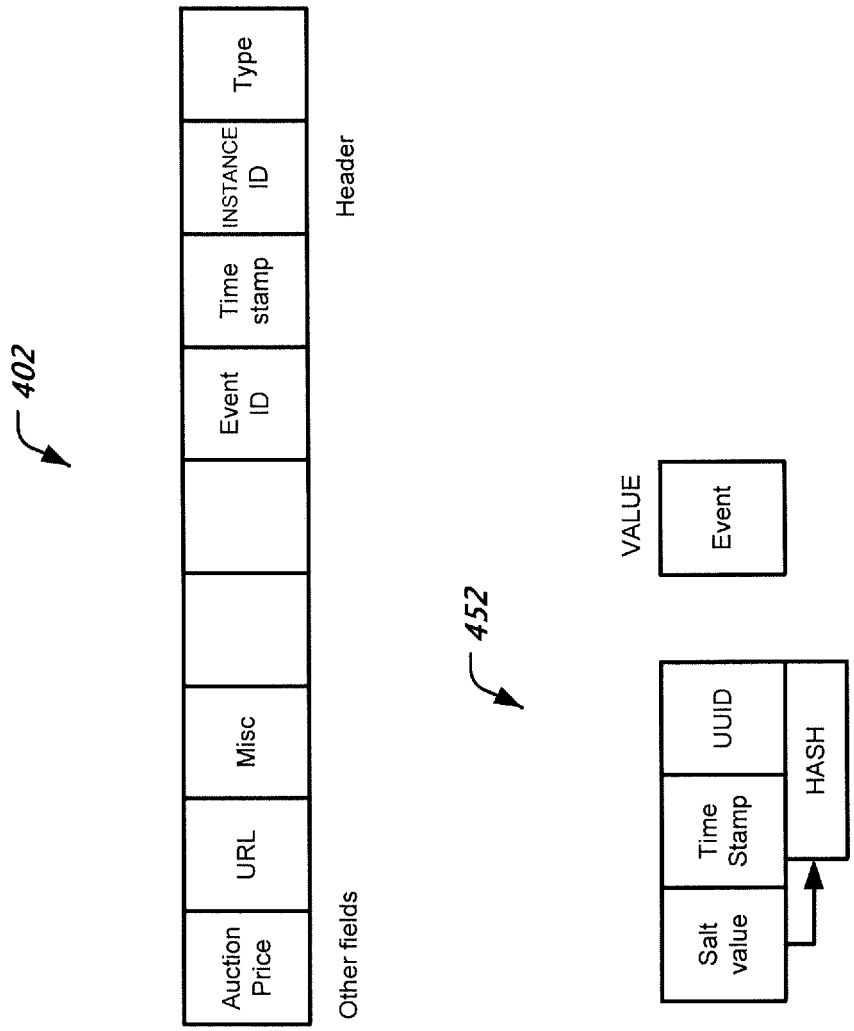
FIG. 4 depicts examples of event records and salted event records.

FIG. 4 depicts an example of an event entry record 402. The event records 402 generated by ad servers may look as follows. Auction Price, URL, Client ID Address, event ID, time stamp, instance ID (ID of the machine) and a type field (e.g., what type of event was it—an auction event, an impression event, etc.). An event ID for each event is generated when the event is logged.

In some databases, it may be easy to write to the database, but random reads can be slow. HBase, which saves the previous values for each entry, is one such example. For example, a typical read operation in HBase may take anywhere between 5× to 25× times more time to read than to write a single event.

In databases that store data by canonically sorting (e.g., alphabetically or numerically ascending or descending order) a range query (e.g., give me all data from row Key 1 to row Key 25) will be much faster than doing twenty five individual reads for each entry. A range query obviously cannot be arbitrarily large because the corresponding data movement may add to overhead outside of the database access. Queries can be made for each entry, by specifying a corresponding start time and/or end time for each key.

When an event ID is a randomly generated UUID, then the events themselves are not alphabetically arranged. In other words, which event happened earlier or later cannot be found out simply by looking at the corresponding event ID, which could be any random value in relation to time.

One possible solution is to use a timestamp in front of the key—then followed by the unique UUID. In other words, the Key used for the database includes a time stamp (e.g., UNIX time) followed by an UUID. By keying event entries like this, two goals are achieved at the same time—key values monotonically change with time and, at the same time, each value is uniquely identifiable. Just the use of a time stamp may not make events unique because multiple events could genuinely have the same time stamp because these events happened at the same time and/or on different ad server machines.

The use of time stamp based linearization can be advantageously used to help with mitigation of duplicate events. For example, if an event has the time stamp 123, then any duplicate of that event must occur in a time range that encompasses that time stamp (e.g., from time 120 to 125). This time stamp will not change due to replay because it is associated with the time at which an event occurred or was created.

One problem with this approach occurs when database entries are distributed across different machines for redundancy. Time stamps typically monotonically increase with events occurring near each other in time and will have corresponding entries of time periods. Thus, all these entries may get distributed to a same server. Data partitioning based on time base thus may lead to uneven use of available database storage and machine use. This may create a scaling problem, that is, an increasing demand on ad insertion may not be satisfied by adding more machines, because at a given time, only one machine may be actively being used for reading and writing operations. The machines may maintain persistent TCP connections, with the data coming from a given machine (locally).

As depicted in 452, in some embodiments, a field called "salt" could be added as a prefix to the time field. This salt may be a function of the event ID such that a unique salt is generated from a given event ID. For example, a hash function may be operated upon the event ID to generate a salt. The salt will be sufficiently random, such that prefixing the time stamp with salt will thus lead to a distribution of entries for given time, along the database.

One possible disadvantage of using the salt prefix is that multiple database read queries may have to be performed multiple times. For example, if a 1-byte salt is used, a given time stamp may get pre-fixed by one of 255 possible values. Therefore, event IDs for that time stamp may have to be looked up by making 255 different read calls to the database. The actual data will then be a union or merge of the results of the 255 range query operations.

A module constructs the seed (salt) and prefixes it to the event entry. Input is an event ID, and output is the computed value of a hash function.

A de-duper module issues a scan request. This module makes a request to receive data from the last time the de-duper module ran its de-duping. The de-duper module keeps track of the end time for which de-duping was performed.

The window within which a de-duper works may thus be defined by a start time and an end time, and over a period of time, the start time and the end time will keep changing. Typically, start time of a next iteration will be equal to the end time of the previous iteration. Once the data is read, which is a chunk of data which may have a number of rows that represent all data that was received in the system in the time interval.

For example, de-duper may be a process running on a same computational platform as the database. The group of data between the start time and the end time of the current iteration may, e.g., comprise a million entries. A module then may further divide this chunk into smaller sections, e.g., 50K to 80K entries per section. For each section, chunks of data are generated.

For example, one ordering may look as shown in Table I.

TABLE I

| Section | Salt | Time Stamp | UUID |
|---------|------|------------|------|
| First   | 1    | 80         | ABC  |
| First   | 1    | 80         | EFG  |
| First   | 1    | 81         | XYZ  |
| Second  | 3    | 80         | F00  |
| Third   | 4    | 80         | F01  |
| Fourth  | 4    | 83         | F04  |

For example, Table I shows that events ABC, EFG, F00 and F01 all were generated at time stamp 80 (i.e., at the same time). The salt value generated by hashing these events happens to have values 1, 1, 3 and 4 respectively.

To reduce complexity, the entries are divided into smaller sections as follows—as long as the salt is the same, and there is no discontinuity in the time stamp, the entries are included in the same section. Referring to Table 1, because the first three rows have the same salt, and there is no discontinuity in time (either same time, or time goes up by one unit). Due to discontinuity in the salt, the fourth entry becomes a separate section. The next entry again becomes a different section because although time stamps do not have discontinuity, the salt value has changed. The next entry, while has the same salt, has a gap in the time, because time has increment by a value more than 0 or 1, thus creating a new section.

The sectionization, or chunking, as described above, would for example result in each section going to the same machine when assigned by HBase for redundancy. One reason why time discontinuities may be seen in the time stamps is because depending on the salt value of a given event, events may be reordered in the database.

Figure 5:
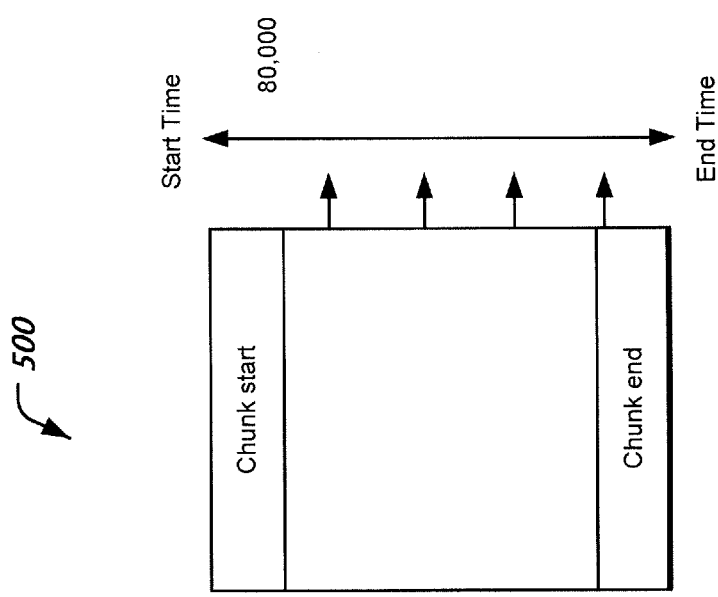
FIG. 5 pictorially depicts chunking and processing of event record entries in a database.

FIG. 5 pictorially depicts chunking and processing of event record entries in a database. As depicted in a snapshot 500 of event record listing, for each of this section, then de-duper issues a query to the database by communicating the start row of a section (e.g., 1,80,ABC in Table I) and the end row of the section (e.g., 1, 81, XYZ in Table I). In other words, these queries will not be specified in terms of times, but sections of all copies of a particular data. The start row of a section and the end row of the section may be used to construct a new scan object with no constraints on time. This new scan object is called a historical scan. The new scan object may provide a historical view. The de-duper may perform de-duplication of data in chunk based on the historical view. The de-duper may de-dupe over 1.2 million events per second, and de-dupe across four days of historical data. Most of the data will typically be on the same machine on which the de-duper is running Another advantageous aspect is that the sections can be recovered by block reads from the database. Due to the time range uniformity, all data will be from the same time window (or next time value).

A time-range scan is to check and process event record entries in a database based on a start time and an end time. The de-duper issues a query to the database by communicating a start time and an end time. As the number of event record files increases, a time-range scan of the HBase database may be preferred because a lot of event record files outside the time-range are ignored. In contrast, the historical scan becomes slower as the number of event record files increases because all the event record files should be scanned. In other embodiment, In other embodiment, one giant event record file may be prepared after a major compaction is run. A time-range scan should scan the entire record file, and this scan takes much more time than a time-range scan for multiple event record files described above. A co-processor may be used for the giant event record file, which enables a time-range scan for recent event records and enables a history scan based on row index for old event records.

The de-duping process thus assures that only entries that are not the same in terms of time and UUID are sent into the de-duped stream. If the de-duping process had seen the same entry before, then it means that this event was processed before and should be excluded from the de-duped stream.

Any application that needs to de-dupe a large event stream (e.g., financial data analysis, banking transaction cross-checking, e-shopping carts), could perform the de-duplication as above. In some applications, data may be processed in real time, or with minimal delay after the data is generated. The data is being divided into multiple portions on different machines. Often, the data could be correlated based on user identifier, or time, and so on, and thus may be susceptible to "hot spotting" on machines. Data is bucketed into units of work that are independent to work on, but within themselves they are dependent within each bucket (e.g., same time).

De-duplication may be performed for events to be joined. Specifically, de-duplication may be performed for events that are randomly generated over long time window such two hour window. For example, mobile devices frequently cache advertisement auction results and display the cached advertisement two hours later from the action time. Thus, an impression is generated two hours after the action. Compared to conventional pipeline processing that loads all the data for the last two hours to perform de-duplication, the present invention does not need to compare event records with all the old data for two hours by referring to a configuration file that defines events to be joined. This allows much faster and accurate debugging at large scale.

Another possible application is when random lookups are converted into sequential lookups due to availability of efficient sequential lookup databases, or when financial transaction history is to be audited or tallied with another independent source of the same transaction.

Another possible application is when people are watching video programs on an internet video based provider that wants to perform audit of the watched video to generate billing information.

Figure 6:
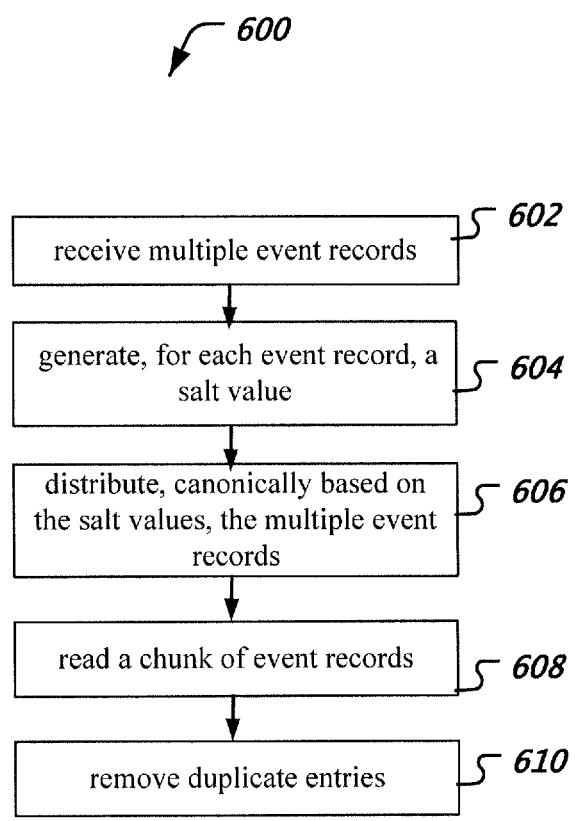
FIG. 6 is a flow chart representation of an example of a method of de-duplicating event records.

FIG. 6 is a flowchart representation of an example of a method 600 of removing duplicate entries from an event records log. The method 600 may be implemented in the billing system, previously described. The method 600 may be implemented on one or more of the computer platforms that include the databases of records, as previously described.

At block 602, the method 600 receives multiple event records. Each event record includes at least an event generation time stamp, event identification, and an event description field, wherein each event identification uniquely identifies the corresponding event record.

At block 604, the method 600 generates, for each event record, a salt value as a function of the corresponding event identification for that event record.

At block 606, the method 600 distributes, canonically based on the salt values, the multiple event records over a number of storage locations.

At block 608, the method 600 reads a chunk of event records from storage location.

At block 610, the method 600 removes duplicate entries from the chunk based on event identifications to generate de-duplicated event records.

In some embodiments, the de-duplicated event records may then be reported to the auditor for the auditor to perform cross-check with reports received from the ad servers.

Figure 7:
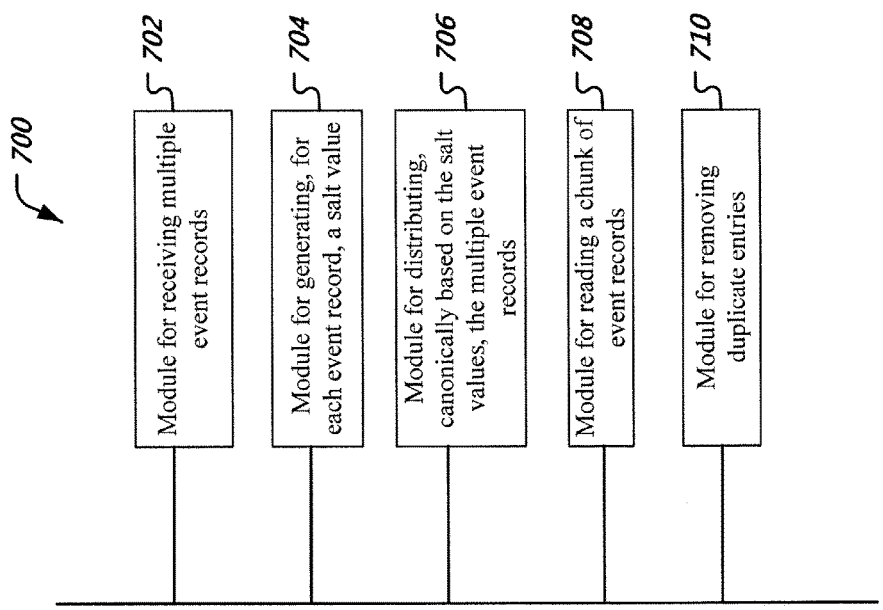
FIG. 7 is a block diagram of an example of an apparatus for generating de-duplicated event listings.

FIG. 7 is a block diagram representation of an example of an apparatus for generating de-duplicated event listings. The apparatus 700 includes several functional modules. A module 702 receives multiple event records, each event record including at least an event generation time stamp, an event identification, and an event description field, wherein each event identification uniquely identifies the corresponding event record. A module 704 generates, for each event record, a salt value as a function of the corresponding event identification for that event record. A module 706 distributes, canonically based on the salt values, the multiple event records over a number of storage locations. The module 708 reads a chunk of event records from storage location. The module 710 that removes duplicate entries from the chunk based on event identifications to generate de-duplicated event records. Each chunk of event records includes entries whose event generation time stamps are continuous with respect to each other and salt values are identical to each other.

Figure 8:
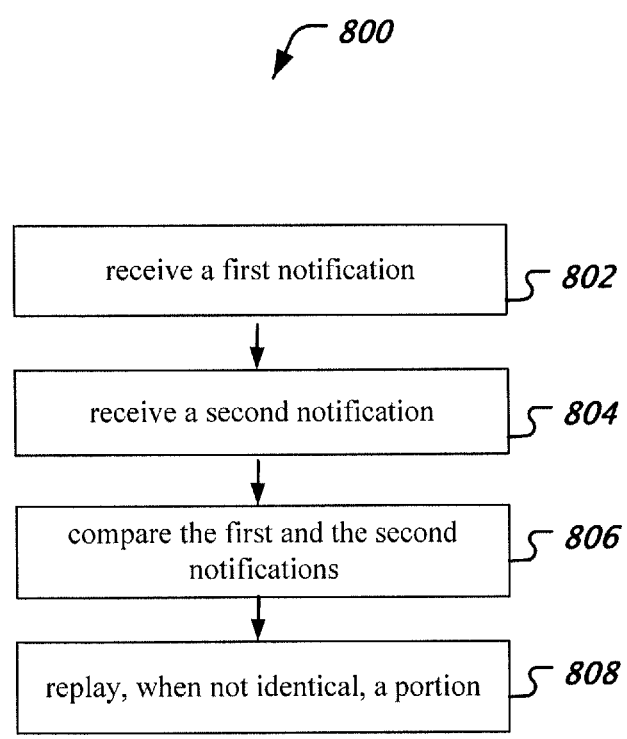
FIG. 8 is a flow chart representation of an example of a method for generating unique events in a video advertisement delivery network.

FIG. 8 is a flowchart representation of a method 800 for generating unique events in a video advertisement delivery network.

At block 802, the method 800 receives a first notification of a first number of events logged at an ad server;

At block 804, the method 800 receives a second notification of a second number of events generated for billing by a billing system;

At block 806, the method 800 compares whether the first number and the second number are identical; and At block 808, the method 800 replays, when the first number and the second number are not identical, a portion of the events logged at the ad server until the first number and the second number are identical.

In some embodiments, a communication system, comprises one or more ad servers that generate events records pertaining to video advertisements served in a communication network and communicate the event records over a transport network, and a de-duplication mechanism that receives the event records from the transport network and removes duplicate entries from the event records by comparing with previously received event records within a time window. The de-duplication mechanism includes: a randomizer module that randomizes the event records; a distribution module that distributes the randomized event records to multiple computer platforms, a chunking module that reads a subset of records on a computer platform; and a comparator module that identifies duplicate entries by comparing a unique identifier of each entry with any previously seen unique identifiers.

It will be appreciated that techniques for identifying duplicate entries in a database where event records are continuously being received are disclosed. In one aspect, the received records are distributed over multiple databases across different computer platforms by using salt values for distribution and for chunking data for subsequent processing.

It will further be appreciated that the disclosed techniques enable scaling of resources such that multiple computer platforms can be used—each platform acting upon a subset of all logged event records—to maintain a desired data processing throughput in which data is incrementally processed based on a moving time window.

The disclosed and other embodiments, modules and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for de-duplicating event records in an event transaction processing system, comprising:
   receiving multiple event records, each event record including at least an event generation time stamp, an event identification, and an event description field, wherein each event identification uniquely identifies the corresponding event record;

generating, for each event record, a salt value as a function of the corresponding event identification for that event record;

distributing, canonically based on the salt values, the multiple event records over a number of storage locations;

reading a chunk of event records from the storage locations; and removing duplicate entries from the chunk based on event identifications to generate de-duplicated event records, wherein each chunk of event records includes entries whose event generation time stamps are continuous with respect to each other and salt values are identical to each other.

2. The method of claim 1, further comprising:

reporting the de-duplicated event records to an auditor for verification.

3. The method of claim 1, wherein the salt value includes a hash value of the corresponding event identification.

4. The method of claim 1, wherein the number of storage locations store data using a database that provides contiguous reads and data persistence.

5. The method of claim 1, wherein each chunk of event records includes 50,000 to 80,000 entries.

6. The method of claim 1, wherein the event records include information about video advertisements displayed using an online video advertisement exchange.

7. The method of claim 1, further comprising:

generating unique events in a video advertisement delivery network.

8. The method of claim 7, wherein generating unique events in a video advertisement comprises:

receiving a first notification of a first number of events logged at an ad server;

receiving a second notification of a second number of events generated for billing by a billing system;

comparing whether the first number and the second number are identical; and replaying, when the first number and the second number are not identical, a portion of the events logged at the ad server until the first number and the second number are identical.

9. The method of claim 8, further comprising:

operating the billing system to receive a report of the events logged from the ad server and perform de-duplication of the events from the report by removing from the report entries that were previously processed by the billing system and included in a calculation of the second number.

10. An apparatus for de-duplicating event logs in an event transaction processing system, comprising:

a module that receives multiple event records, each event record including at least an event generation time stamp, an event identification, and an event description field, wherein each event identification uniquely identifies the corresponding event record;

a module that generates, for each event record, a salt value as a function of the corresponding event identification for that event record; a module that distributes, canonically based on the salt values, the multiple event records over a number of storage locations;

a module that reads a chunk of event records from the storage locations; and a module that removes duplicate entries from the chunk based on event identifications to generate de-duplicated event records, wherein each chunk of event records includes entries whose event generation time stamps are continuous with respect to each other and salt values are identical to each other.

11. The apparatus of claim 10, further comprising:

a module that reports the de-duplicated event records to an auditor for verification.

12. The apparatus of claim 10, wherein the salt value includes a hash value of the corresponding event identification.

13. The apparatus of claim 10, wherein the number of storage locations store data using a database that provides contiguous reads and data persistence.

14. The apparatus of claim 10, wherein the event records include information about video advertisements displayed using an online video advertisement exchange.

15. The apparatus of claim 10, wherein the event identification is a 128 bit global unique identifier generated randomly.

16. A computer program product comprising a non-transitory computer-readable program medium having code stored thereon, the code when executed, causing one or more processors to implement a method of operating a video advertisement exchange system, the method comprising:

receiving multiple event records, each event record including at least an event generation time stamp, an event identification, and an event description field, wherein each event identification uniquely identifies the corresponding event record;

generating, for each event record, a salt value as a function of the corresponding event identification for that event record;

distributing, canonically based on the salt values, the multiple event records over a number of storage locations;

reading a chunk of event records from the storage locations; and removing duplicate entries from the chunk based on event identifications to generate de-duplicated event records, wherein each chunk of event records includes entries whose event generation time stamps are continuous with respect to each other and salt values are identical to each other.

17. The computer program product of claim 16, wherein the method further comprises:

reporting the de-duplicated event records to an auditor for verification.

18. The computer program product of claim 16, wherein the event records include information about video advertisements displayed using an online video advertisement exchange.

* * * * *